United States Patent
Tabatowski-Bush et al.

(10) Patent No.: US 7,679,211 B2
(45) Date of Patent: Mar. 16, 2010

(54) ELECTRICAL DISCONNECT SYSTEM

(75) Inventors: Benjamin A. Tabatowski-Bush, Northville, MI (US); Brian J. Denta, Kokomo, IN (US)

(73) Assignee: Ford Global Technologies, LLC, Dearborn, MI (US)

( * ) Notice: Subject to any disclaimer, the term of this patent is extended or adjusted under 35 U.S.C. 154(b) by 134 days.

(21) Appl. No.: 11/755,321

(22) Filed: May 30, 2007

(65) Prior Publication Data

US 2008/0297303 A1    Dec. 4, 2008

(51) Int. Cl.
  *B60L 1/00*   (2006.01)
  *B60L 3/00*   (2006.01)
  *H02G 3/00*   (2006.01)
(52) U.S. Cl. ...................................... 307/9.1
(58) Field of Classification Search ............ 307/9.1, 307/10.7; 320/109, 111; 338/50, 220, 221
See application file for complete search history.

(56) References Cited

U.S. PATENT DOCUMENTS

| | | | |
|---|---|---|---|
| 4,533,970 A | 8/1985 | Brown | |
| 5,491,418 A * | 2/1996 | Alfaro et al. | 324/402 |
| 5,859,580 A * | 1/1999 | Hashizawa et al. | 337/260 |
| 6,668,963 B2 | 12/2003 | Nada | |
| 6,700,765 B2 | 3/2004 | Ely | |
| 2001/0017756 A1 | 8/2001 | Iyoda | |
| 2006/0158816 A1 | 7/2006 | Harris | |
| 2009/0039703 A1* | 2/2009 | Soma et al. | 307/10.1 |

* cited by examiner

*Primary Examiner*—Albert W Paladini
*Assistant Examiner*—Carlos Amaya
(74) *Attorney, Agent, or Firm*—David B. Kelley; Brooks Kushman P.C.

(57) ABSTRACT

The disclosed embodiments include an electrical disconnect system and method for a vehicle having a high voltage electrical system. In one embodiment, the system includes a service disconnect base being electrically coupled to the electrical system. A service disconnect plug is attachable to the service disconnect base and has a resistive device integrally formed therein. Current within the electrical system flows through the service disconnect base and the service disconnect plug when the service disconnect plug is connected to the service disconnect base. The current is limited to a current level no greater than a predetermined current level.

19 Claims, 1 Drawing Sheet

ELECTRICAL DISCONNECT SYSTEM

TECHNICAL FIELD

The embodiments described herein relate to an electrical disconnect system.

BACKGROUND

Vehicles such as hybrid electric vehicles (HEVs) and electrical vehicles (EVs) typically utilize a high voltage electrical system. To ensure safety when servicing these vehicles, a number of electrical protection systems have been developed. In many cases, these protection systems employ a switching device or arrangement that causes an open circuit in the vehicle's electrical system so as to prevent the flow of current. Although the conventional protection systems are useful, there exists a wide horizon for improvement. Particularly, diagnoses and servicing of some electrical system anomalies are possible only when the electrical system is energized. Accordingly, the servicing and/or diagnoses of vehicle electrical systems with the conventional protection systems further complicated, if not impossible.

The embodiments described herein were conceived in view of these and other disadvantages of systems adapted to ensure safety when servicing vehicles with high voltage electrical systems.

SUMMARY

The disclosed embodiments include an electrical disconnect system and method for a vehicle having a high voltage electrical system. In one embodiment, the system includes a service disconnect base being electrically coupled to the electrical system. A service disconnect plug may be configured to connect to the service disconnect base wherein current within an electrical system flows through the service disconnect base and the service disconnect plug when the service disconnect plug is connected to the service disconnect base. Additionally, a resistive device may be integrated with the service disconnect plug. The resistive device has a fixed resistant value and limits the flow of current through the high voltage electrical system to a current level no greater than a predetermined current level.

The method includes a method for servicing a vehicle having the high voltage electrical system. The method includes providing a service disconnect base that is electrically coupled to the electrical system. The method may further include providing a service disconnect plug configured to connect to the service disconnect base wherein current within the electrical system flows through the service disconnect base and the service disconnect plug when the service disconnect plug is connected to the service disconnect base. An additional step may include integrating a resistive device with the service disconnect plug. In one embodiment, the resistive device has a fixed resistance value and limits the flow of current through the high voltage electrical system to a current level no greater than a predetermined current level when the service disconnect plug is connected to the service disconnect base.

BRIEF DESCRIPTION OF THE DRAWINGS

The novel features of the described embodiments are set forth with particularity in the appended claims. These embodiments, both as to their organization and manner of operation, together with further advantages thereof, may be best understood with reference to the following description, taken in connection with the accompanying drawings in which:

DETAILED DESCRIPTION OF THE EMBODIMENT(S)

As required, detailed descriptions of embodiments are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific functional details disclosed herein are not to be interpreted as limiting, but merely as a representative basis for the claims and/or as a representative basis for teaching one skilled in the art.

Figure 1:
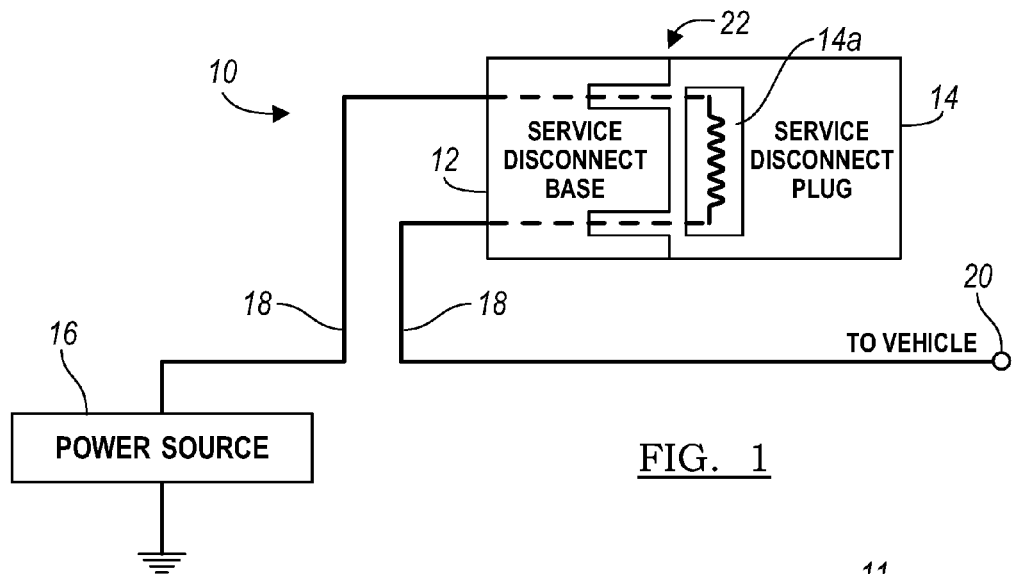
FIG. 1 illustrates a simplified electrical disconnect system in accordance with an embodiment of the present invention.

Referring to FIG. 1, an electrical system 10 having an electrical service disconnect system 22 is shown. Electrical system 10 may be an electrical system for a vehicle. In one embodiment, electrical system 10 may be a high voltage electrical system for a hybrid electric vehicle (HEV) and/or an electric vehicle (EV).

As shown, electrical system 10 includes a power source 16. Power source 16 may be a high voltage battery pack, ultracapacitor and the like. In one embodiment, power source 16 is chargeable up to a voltage of 450 volts. It is recognized, however, that the specific voltage rating for power source 16 may vary in accordance with the particular implementation.

Service disconnect system 22 includes a service disconnect base 12 that is attachable to a service disconnect plug 14. In one aspect of the invention, service disconnect base 12 may have one or more slots or openings that receive a male type connector that is integrated with service disconnect plug 14. A resistive device 14a is integrated with service disconnect plug 14. In one embodiment, resistive device 14a is a resistor having a fixed resistance value of 225 kilo-ohms. Alternative embodiments may have a resistance value that varies in accordance with design and performance requirements.

In one embodiment, service disconnect plug 14 may be connected to service disconnect base 12 to enable diagnostics of the electrical system. In such a case, service disconnect plug 14 is connected to the service disconnect base 12 when the vehicle is in a service mode. The service mode includes the vehicle being in an immobile state to enable servicing, trouble shooting and the like. Additionally, while the vehicle is in an immobile state, the service mode includes the vehicle's electrical system having a sufficient current level that allows vehicle diagnostics without the risk of an anomalies that may result from contacting the electrical system. As such, the resistance value of resistive device 14a is set to limit the current level. The current level for vehicle diagnostics would be an amount that is no greater than a desired current level. For example, the desired current level by which vehicle diagnostics may occur may be a current level of 2 milliamperes (mA).

When service disconnect plug 14 is connected to service disconnect base 12, current flowing from power source 16 over electrical lines 18 flows through resistive device 14a. As current flows from power source 16 through disconnect base 12 and service disconnect plug 14, the current flows from node 20 to other devices/components connected to service disconnect system 10.

Figure 2:
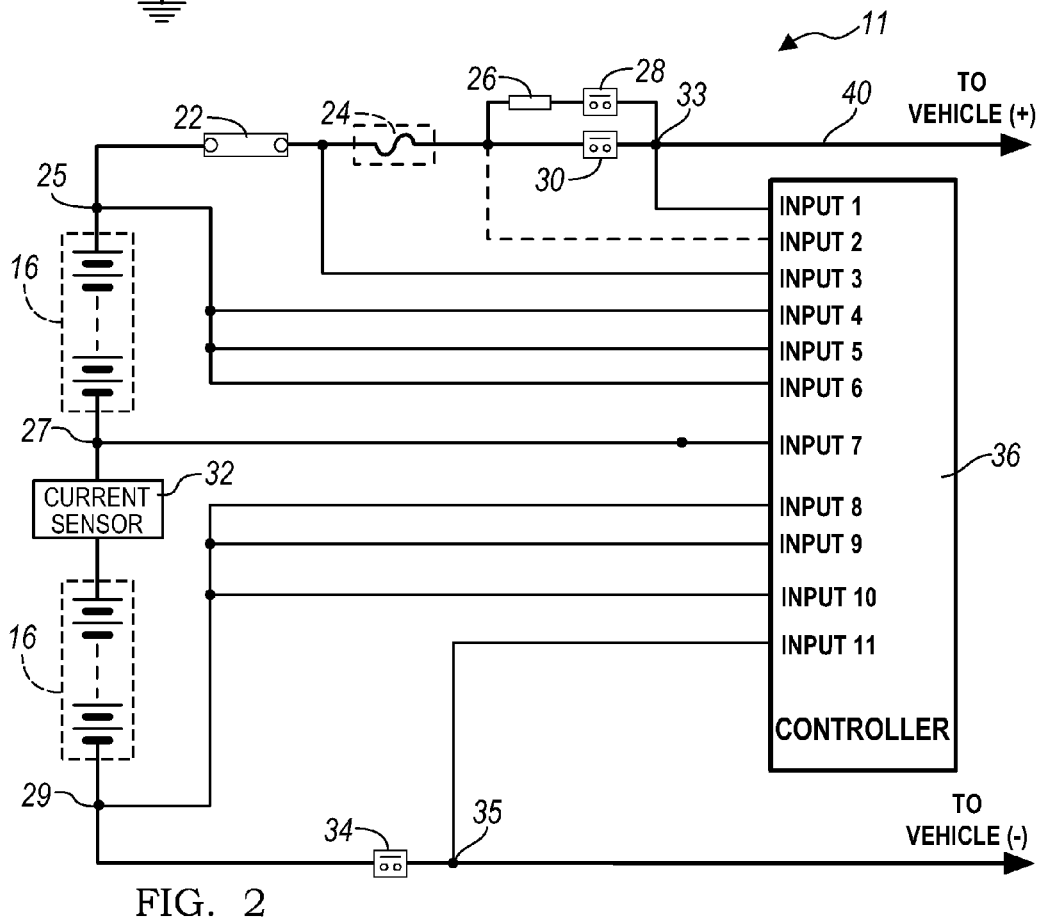
FIG. 2 illustrates an embodiment of a schematic diagram for an electrical system having the electrical disconnect system of FIG. 1.

Referring to FIG. 2, an electrical system 11 is shown. Electrical system 11 is a detailed schematic of the electrical system shown in FIG. 1. In this embodiment, power source 16 is divided into multiple parts commonly referred to as packs. For example, between a node 25 and a node 27 power source 16 may have a first half pack. Also, between a node 27 and a node 29 power source 16 may have a second half pack. As described above, power source 16 provides voltages and currents for electrical system 11. A current sensor 32 detects the flow of current from power source 16. In one embodiment, current sensor 32 generates signals indicative of the detected current to a controller 36.

Service disconnect system 22 is shown in a series connection with power source 16. A fuse 24 may be included for limiting the amount of current that flows through electrical system 11. The specific current rating for fuse 24 varies in accordance with design and safety requirements. In some embodiments, fuse 24 may also be integrated with service disconnect system 22.

Electrical system 11 also includes a resistor 26, a contactor 28, a contactor 30, and a contactor 34. Contactors 28, 30 and 34 may be electrical switches that are opened and closed in response to signals from controller 36 that disable or enable the flow of current. In one aspect, contactors 28, 30 and 34 are closed in a predetermined sequence so as to minimize the chance of undesirable voltage and current spikes on electrical system 11. For instance, contactor 34, which is shown connected to a negative terminal of power source 16, may be initially commanded to be closed by controller 36. Subsequently, contactor 28 having a pre-charge resistor 26 may be commanded to close. Upon a determination by controller 36 that a sufficient minimal voltage has been applied to electrical line 40 as a result of the closing of contactor 28, contactor 30 would be commanded to close.

As shown, controller 36, which may be a data processing and storage device, processes signals from various points within electrical system 11. As such, controller 36 may have a plurality of inputs (input 1-input 11) that enable the receipt of electrical signals from various points within electrical system 11. It is recognized that in some embodiments, voltages that are processed via controller 36 are in reference to voltages at node 27, which represents one-half of the total voltage for power source 16. Accordingly, input 7 for controller 36 receives signals indicative of the voltage at node 27.

Inputs 1 and 11 may be used to determine and/or control the state/position of contactors 28, 30 and 34. For example, signals received from node 33 indicate the position of contactors 28 and 30. Additionally, based on signals from node 35, controller 36 determines the position of contactor 34. Input 2 serves as an input for determining the voltage of fuse 24. Input 3 may be used as an input to determine whether service disconnect assembly 22 is present (i.e., whether or not service disconnect plug 14 (FIG. 1) has been connected to service disconnect base 12 (FIG. 1)).

Input 4 serves as an input that enables controller 36 to determine if there are any unintended short circuits within portions of electrical system 11. Likewise, input 10 may serve as an input to enable controller 36 to determine whether there are short circuits within portions of electrical system 11. Additionally, inputs 5, 6, 8 and 9 may enable the determination of the voltage for power source 16. Particularly, inputs 5 and 6 may indicate the voltage for power source 16 between nodes 25 and 27 while inputs 8 and 9 provide an indication of the voltage for power source 16 between nodes 27 and 29.

Controller 36 having received and processed the inputs may be coupled to other diagnostic devices to enable a user/serviceman to analyze, diagnose, and service electrical system 11. Controller 36 may also provide the user/serviceman with information to indicate the state/condition of power source 16 any undesirable system anomalies.

While the best mode for carrying out the invention has been described in detail, those familiar with the art to which this invention relates will recognize various alternative designs and embodiments for practicing the invention as defined by the following claims.

What is claimed:

1. An electrical disconnect system for a vehicle having a high voltage electrical system, the system comprising:
   a service disconnect base being electrically coupled to the electrical system;
   a service disconnect plug configured to be connected to the service disconnect base when the vehicle is in a service mode, wherein current within the electrical system flows through the service disconnect base and the service disconnect plug when the service disconnect plug is connected to the service disconnect base; and
   a resistive device integrated with the service disconnect plug, wherein the resistive device has a fixed resistance value and limits the flow of current and is incapable of completely disabling the flow of current through the high voltage electrical system so that the electrical system is capable of providing the voltage transfer of up to 450 volts to enable one or more points of the high voltage electrical system to be examined when the vehicle is in the service mode.

2. The system of claim 1, wherein the resistive device has a resistance value of approximately 225 kilo-ohms.

3. The system of claim 1, wherein the vehicle includes at least one of a hybrid electric vehicle (HEV) and an electric vehicle (EV).

4. The system of claim 3, wherein the vehicle includes a high voltage battery pack that energizes the electrical system, the battery pack being adapted to be charged up to 450 volts.

5. The system of claim 4, further comprising a controller being in communication with the service disconnect base and the service disconnect plug, the controller monitoring the battery pack and the electrical system, the controller outputting data relating to the monitored battery pack and the electrical system.

6. The system of claim 1, wherein the fixed resistance limits the flow of current through the high voltage system to a predetermined current level of approximately 2 milliamperes (mA).

7. The system of claim 1, wherein the service mode includes the vehicle being in an immobile state while the electrical system has a current level for vehicle diagnostics that is generally equal to a predetermined current level.

8. A method for servicing a vehicle having a high voltage electrical system, the method comprising:
   providing a service disconnect base that is electrically coupled to the electrical system;
   providing a service disconnect plug configured to be connected to the service disconnect base when the vehicle is in a service mode, wherein current within the electrical system flows through the service disconnect base and the service disconnect plug when the service disconnect plug is connected to the service disconnect base; and
   integrating resistive device within the service disconnect plug, wherein the resistive device has a fixed resistance value and limits the flow of current and is incapable of completely disabling the flow of current through the high voltage electrical system so that the electrical system is capable of providing the voltage transfer of up to 450 volts to enable one or more points of the high voltage electrical system to be examined when the vehicle is in the service mode.

9. The method of claim 8, wherein the resistive device has a resistance value of approximately 225 kilo-ohms.

10. The method of claim 8, wherein the vehicle includes at least one of a hybrid electric vehicle (HEV) and an electric vehicle (EV).

11. The method of claim 10, wherein the vehicle includes a high voltage battery pack that energizes the battery pack being adapted to be charged up to 450 volts.

12. The method of claim 11, further comprising a controller being in communication with the service disconnect base and the service disconnect plug, the controller monitoring the battery pack and the electrical system, the controller outputting data relating to the monitored battery pack and the electrical system.

13. The method of claim 8, wherein the service mode includes the vehicle being in an immobile state while the electrical system has a current level for vehicle diagnostics that is generally equal to a predetermined current level.

14. The method of claim 8, wherein the predetermined current level is approximately 2 milliamperes (mA).

15. An electrical disconnect system for a vehicle having a high voltage electrical system, the system comprising:
 a service disconnect base being electrically coupled to the high voltage electrical system;
 a service disconnect plug configured to be connected to the service disconnect base when the vehicle is in a service mode, wherein current within the electrical system flows through the service disconnect base and the service disconnect plug when the service disconnect plug is connected to the service disconnect base;
 a resistive device integrated with the service disconnect plug so as to be in a series connection with the electrical system when the service disconnect plug is connected to the service disconnect base, wherein the resistive device has a fixed resistance value and limits the flow of current and is incapable of completely disabling the flow of current through the high voltage electrical system so that the electrical system is capable of providing the voltage transfer of up to 450 volts to enable one or more points of the high voltage electrical system to be examined when the vehicle is in the service mode; and
 a controller being in communication with the service disconnect base and the service disconnect plug, the controller monitoring the battery pack and the electrical system, the controller outputting data relating to the monitored battery pack and the electrical system.

16. The system of claim 15, wherein the service mode includes the vehicle being in an immobile state while the electrical system has a current level for vehicle diagnostics that is generally equal to a predetermined current level.

17. The system of claim 15, wherein the predetermined current level is approximately 2 milliamperes (mA).

18. The system of claim 15, wherein the vehicle includes at least one of a hybrid electric vehicle (HEV) and an electric vehicle (EV).

19. The system of claim 15, wherein the resistive device has a resistance value of approximately 225 kilo-ohms.

\* \* \* \* \*